July 23, 1929.　　　G. H. HUFFERD ET AL　　　1,721,695
METHOD OF MAKING TUBULAR FRONT AXLES
Filed Dec. 19, 1925　　　4 Sheets-Sheet 2
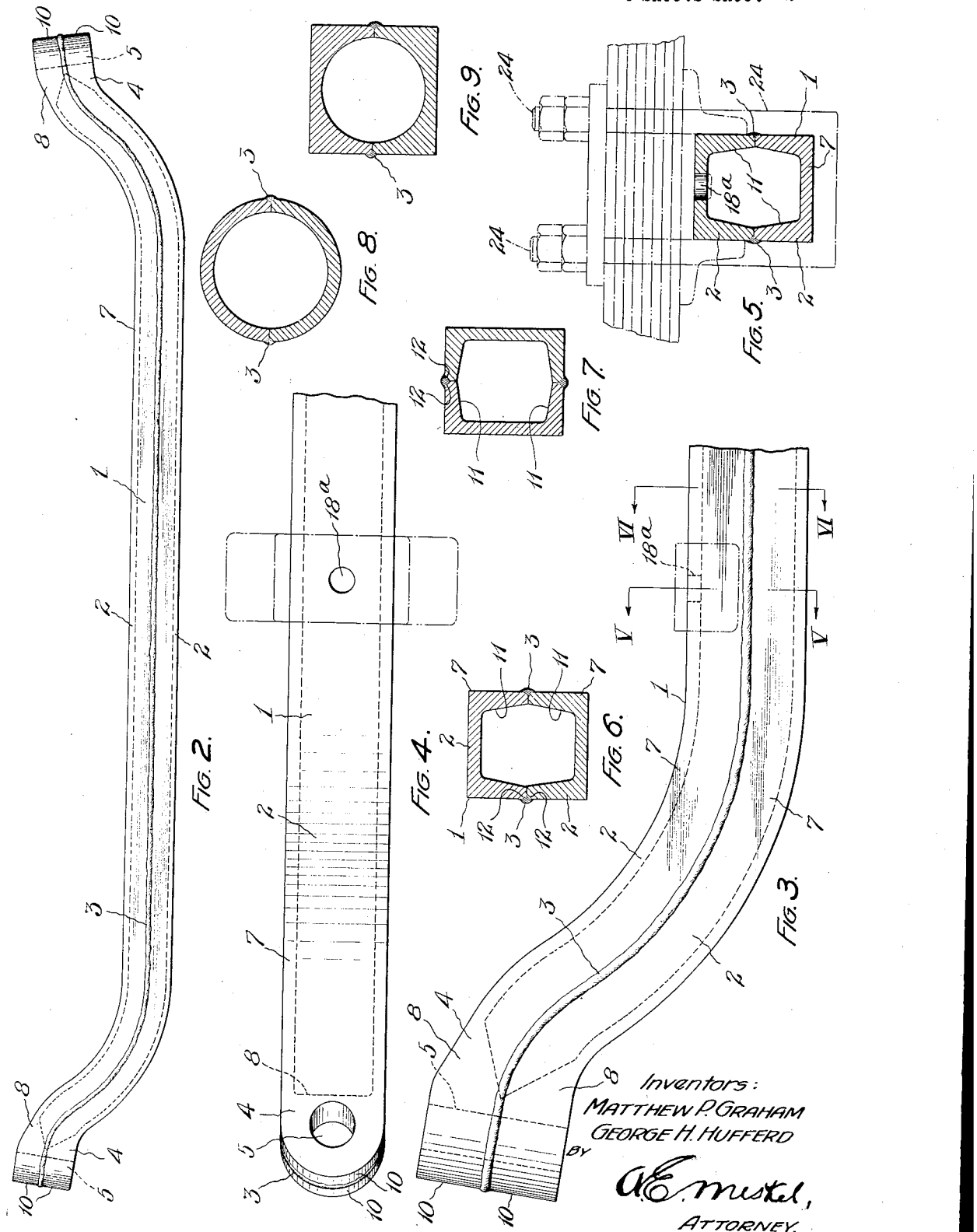
Inventors:
MATTHEW P. GRAHAM
GEORGE H. HUFFERD
BY
A. E. Mistel,
ATTORNEY.

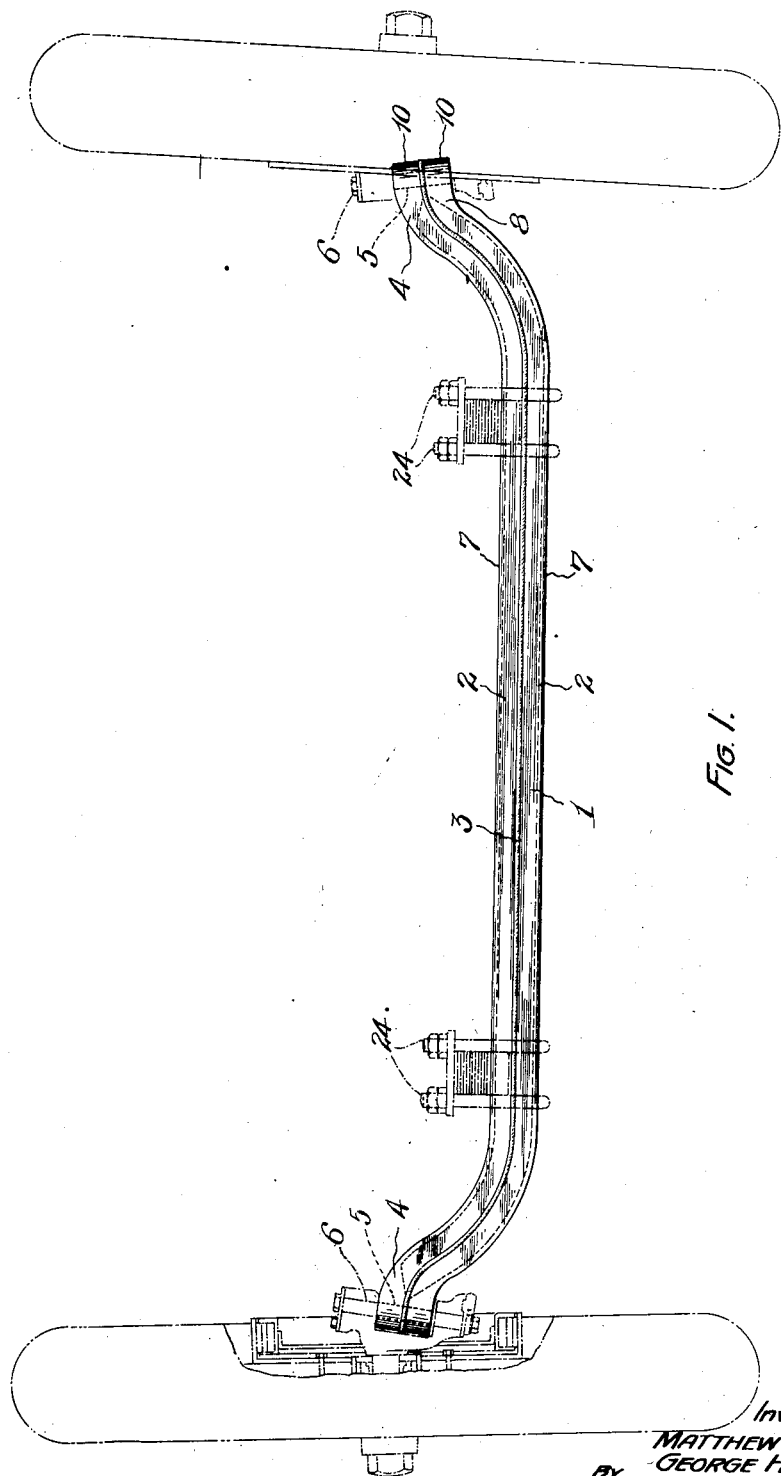

July 23, 1929.  G. H. HUFFERD ET AL  1,721,695
METHOD OF MAKING TUBULAR FRONT AXLES
Filed Dec. 19, 1925   4 Sheets-Sheet 3
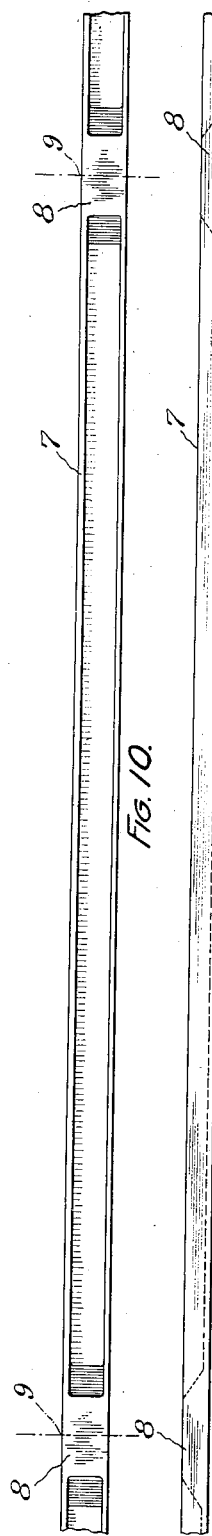
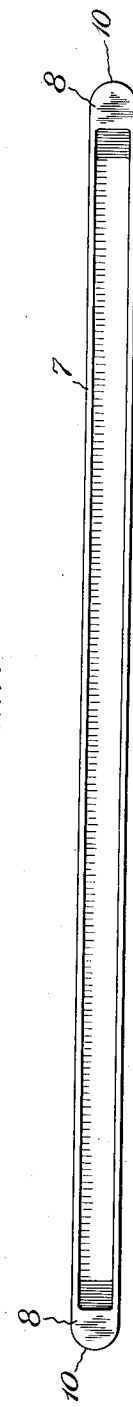
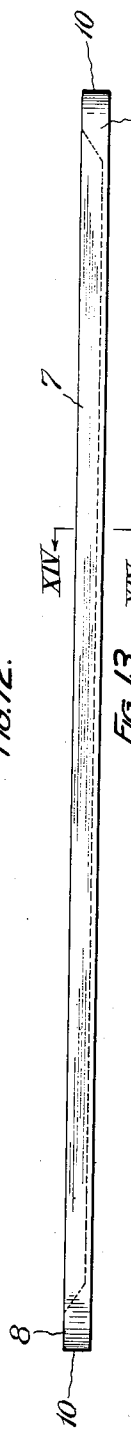
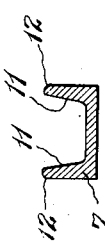
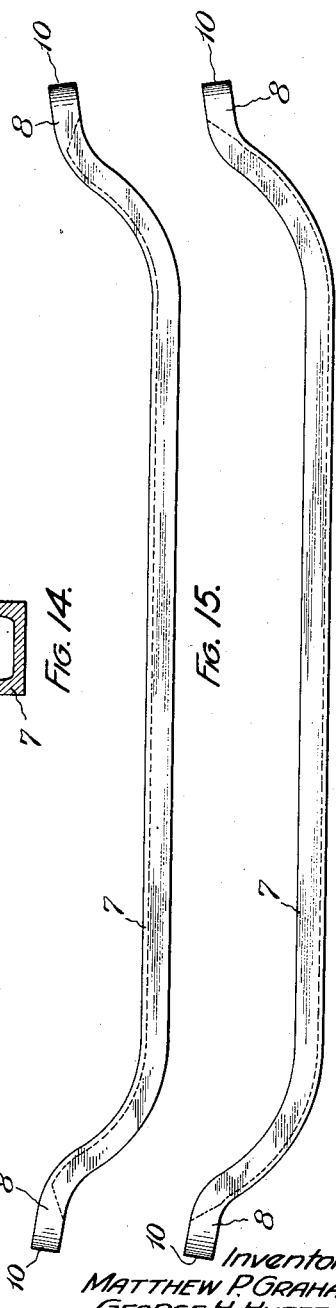
Inventors:
MATTHEW P. GRAHAM
GEORGE H. HUFFERD
BY
ATTORNEY

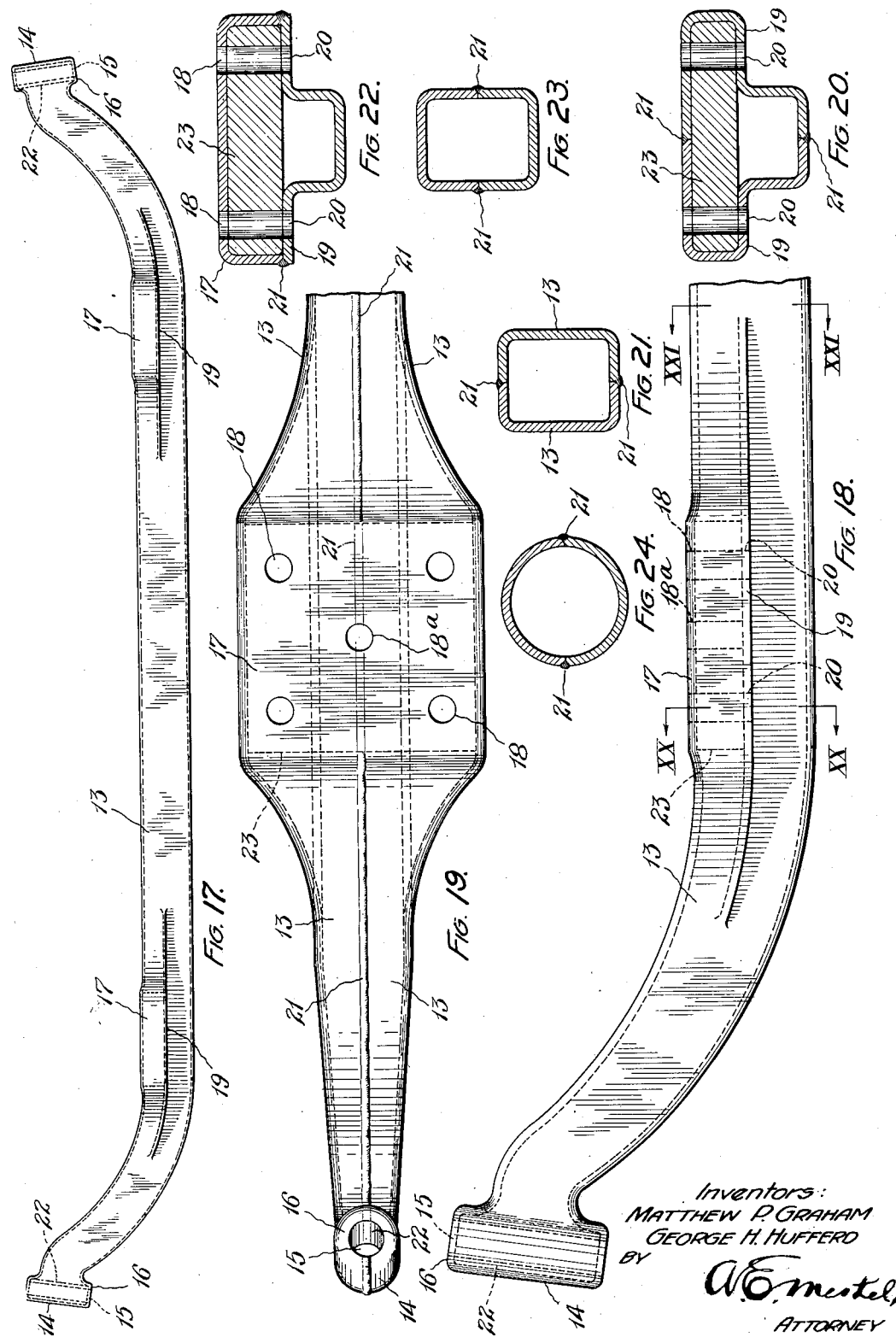
July 23, 1929.  G. H. HUFFERD ET AL  1,721,695
METHOD OF MAKING TUBULAR FRONT AXLES
Filed Dec. 19, 1925  4 Sheets-Sheet 4
Inventors:
MATTHEW P. GRAHAM
GEORGE H. HUFFERD
BY
ATTORNEY Patented July 23, 1929.

1,721,695

UNITED STATES PATENT OFFICE.

GEORGE H. HUFFERD AND MATTHEW P. GRAHAM, OF DETROIT, MICHIGAN, ASSIGNORS TO THOMPSON PRODUCTS INC., OF CLEVELAND, OHIO, A CORPORATION OF OHIO.

METHOD OF MAKING TUBULAR FRONT AXLES.

Application filed December 19, 1925. Serial No. 76,457.

The invention relates to a one-piece tubular member having thin walls and a substantially solid end, and more particularly to front axle centers for automobiles. The front axle center is that part of an automobile to which the stub axles of the front wheels are pivoted and which, with the rear axle, sustain the sprung weight of the car. The front axle center sustains about one-half the weight of the car and as it is subjected in all cases to the static load, and, where four wheels brakes are employed, also to torsional stress at its outer ends, it must be very strong. As commonly constructed, this part is formed of an I-beam which must necessarily be of considerable weight. In order to make this part lighter and so decrease the unsprung weight of the car, a tubular axle center has been used having an intermediate tubular part and tubular end sections with solid ends welded together. Such a construction is too weak effectively to withstand the stresses to which such a part is subjected in use, and it also involves an increase in the cost of manufacture. It was considered necessary to use three parts in order that the ends could be constructed with sufficient strength and body to serve as a means for pivotal engagement with the stub axles of the front wheels.

The object of the invention, therefore, is to decrease the weight of front axle centers as found in the present I-beam or like solid construction at a point equal to and even below the three part tubular construction referred to above, at the same time avoiding the weakness of the latter and very materially decreasing the manufacturing cost.

The broad idea involved in this invention has heretofore been embodied in a different form by another and is made the basis of a concurrently filed application. We have conceived other forms in which are employed light mating sections welded together on longitudinal lines to form a one-piece structure, and of processes for making the same. By forming the axle center of two mating sections welded together, on longitudinal lines, the joint is located with respect to the bending and torsional stresses to which it is subjected so that such forces are ineffective materially to weaken even a comparatively light construction, and the integral end portions are of sufficient strength for direct connection with the front steering knuckles.

Such a member may be constructed in different forms and by different methods. For the purpose of exemplifying the invention two different forms will now be described, together with processes for making them, but it is to be understood that the invention is not confined thereto.

The form which at this time seems preferable, at least from a commercial aspect, is illustrated in Figs. 1 to 16 and will be first described, followed by a description of a modified form.

Referring to the annexed drawings:

Figure 1 is a front elevation of an axle center, made in accordance with our invention;

Fig. 2 is an elevation of our preferred form of axle center;

Fig. 3 is an enlarged view of the end thereof;

Fig. 4 is a top plan view of Fig. 3;

Fig. 5 is a vertical cross section of Fig. 3 on the line V—V of Fig. 3 showing a spring pad and securing means therefor in dotted lines;

Fig. 6 is a cross section on line VI—VI of Fig. 3;

Fig. 7 is a view similar to Fig. 6 showing a modified type of cross section;

Figs. 8 and 9 are similar views of other types of cross sections;

Fig. 10 is a plan view of a portion of a long rolled bar from which the axle center of Fig. 2 is made;

Fig. 11 is a side elevation of Fig. 10;

Fig. 12 is a plan view of one section cut from the long bar shown in Fig. 10, having its ends trimmed to proper form;

Fig. 13 is a side elevation thereof;

Fig. 14 is a cross section of Fig. 13 on line XIV—XIV;

Fig. 15 is a side elevation of a section made from the bar illustrated in Figs. 12 and 13 formed to make the upper half of the axle center;

Fig. 16 is a side elevation of a similar section made to form the lower half of the axle center;

Fig. 17 is an elevation of a modified form of axle center;

Fig. 18 is an enlarged view of the end portion thereof;

Fig. 19 is a plan view of Fig. 18;

Fig. 20 is a cross section on line XX—XX of Fig. 18;

Fig. 21 is a vertical cross section on line XXI—XXI of Fig. 18;

Fig. 22 is a view similar to Fig. 20 of a slight modification, in which the mating sections are so constructed as to adapt them to be joined together with the joints in a horizontal plane when in use.

Fig. 23 is a cross section similar to that of Fig. 21 of the modified form shown in Fig. 22;

Fig. 24 is a view similar to Fig. 23 illustrating an axle center whose main portion is circular in cross section.

Referring to the drawings in detail in which the same reference numeral is used to designate the same part throughout, and particularly to Figs. 1 to 16, showing the preferred form, a tubular axle center 1, composed of two mating sections 2, of any suitable cross section, welded together at their meeting edges, as indicated at 3, is provided with substantially solid ends 4 having transverse apertures 5, adapted to receive pintles 6 connected with the front steering knuckles of an automobile. These apertures 5 are preferably arranged at a slight angle to a horizontal plane passing through the longitudinal axis of the main central part of the axle center. The mating sections may be of many different shapes, some of which are illustrated in Figs. 6, 7, 8 and 9, and the same section may have one shape for a part of its length and another shape at a different part, for purposes hereinafter indicated. As indicated in Figs. 6 and 7 each section is of general U-shape; as indicated in Fig. 8, of semi-cylindrical; and as indicated in Fig. 9, of rectangular outside contour with a semi-cylindrical groove in one face.

The process employed in constructing this form of the axle center will now be described, reference being had particularly to Figs. 10 to 16.

It is well known in the art of rolling metal bars that a heated solid bar of steel may be passed between two rolls provided respectively with male and female dies, by which the bar may be rolled into any desired shape during its passage therethrough, and that this process has been employed to form from the bar a plurality of similar articles in recurrent pattern. However, so far as we are aware, the idea involved in such process has not contemplated, heretofore, the formation by die-rolling of a plurality of shapes in recurrent pattern which are later severed, fitted and secured to each other by welding to form a one-piece member, nor has the prior art contemplated an article such as we have conceived, adapted to form a one-piece axle center with integral, substantially solid ends. We utilize the basic idea of the prior art by passing a heated solid bar of steel between die-rolls (not shown) which shape the bar into recurrent channel forms 7, joined by substantially solid sections 8, which are afterward severed at an intermediate point, as indicated at 9 (Fig. 10). The sections so severed are then suitably finished, as indicated at 10 (Fig. 12). As above indicated, these sections may be of any shape suitable for the purpose for which the article is designed, or, if to be employed as an axle center, for the particular situation necessary to fulfill the requirements thereof. In die-rolling, it is known that, in order to free the bar from the rolls, the inside walls of a channel member, or both the inside and outside walls, should have a slight inclination, known as the "draft", such as indicated at 11, Figs. 6 and 7, but, aside from this requirement, its particular shape is not material. Where the finished article is used as an axle center the outer contour of the sections may be angular to provide a suitable seat for a spring pad, and to prevent turning thereof as indicated in dotted lines in Figs. 1 and 5. Or the outer contour may be cylindrical as indicated in Fig. 8, and the spring pad may be secured thereto by any suitable means, or it might be angularly shaped locally for that purpose.

After the sections have been finished, as indicated in Fig. 12, they are bent to any desired form adapting one section to fit another to form the desired article. When they are designed to form a dropped axle center they take the form illustrated in Figs. 15 and 16, Fig. 15 showing the upper half and Fig. 16 the lower half, of such article.

It may be found desirable to round off the edges of the channeled sections, as indicated at 12, Fig. 14, which may be done in the rolling process or afterward, by grinding or machining.

The two mating sections are then placed together with the edges of the channels in abutting relation and the joint is welded by well known methods. These joints may be so arranged as to be in vertical or horizontal planes when the article is in use, as conditions appear to demand. In an axle center it is generally preferable to arrange the joints in a horizontal plane, which is a neutral zone, the upper section being in compression and the lower section in tension, although this arrangement is not essential. After welding the sections together the substantially solid ends 4 are bored out to form the pintel receiving aperture 5, or otherwise formed to meet requirements.

An axle center constructed according to the described process is, in effect, a one-piece structure, may be manufactured at low cost, is strong in all its parts, and is well adapted for direct connection with the steering knuckles of an automobile.

An axle center of similar characteristics may be made by quite a different process, in which sheet metal is employed, rolled or stamped into mating sections similar to those above described. Such an axle center is illustrated in Figs. 17 to 24. The process employed in this form is well known and the article only will therefore be described, reference being made only incidentally to the steps of the process.

A sheet of metal is rolled or pressed into channel form, as indicated in connection with the description of the preferred form, to provide mating sections 13, with integral, cylindrical ends 14, in which is formed an opening 15 bounded by a flange 16. As in the preferred form, the cross section of the channel may be of any desired shape, as indicated in Figs. 20 to 24. When the section is formed by rolling, it is rolled straight and afterward bent to shape at the ends. The upper section is preferably provided with enlarged portions 17 at the points where the spring pads are to have their seats, having a plurality of bolt receiving apertures 18 and a central dowel receiving aperture 18ª. The mating lower section is provided with flanges 19, of corresponding dimensions, provided with similar bolt receiving apertures 20.

After so forming the mating sections the edges of the channels are placed together and secured by welding, as indicated at 21. The joints are arranged as described above in connection with the description of the preferred form. The cup-shaped cylindrical end portions 14 of the mating sections with the flanges 16 form a retainer for any suitable bearing member 22, in which bears the pintle of the steering knuckle, as above described.

The enlarged portion 17 of the upper half section, together with the flanges 19 of the lower half section, form a cavity in which is placed a filling block 23, which serves to prevent the bolts, securing the spring pads to the axle center, from distorting the stamping. The central aperture 18ª is the dowel opening (see Fig. 5), and the remainder are adapted to receive the spring bolts 24, (see Fig. 5) which secure the spring pad in place.

It will be apparent from the above description that we have produced an axle center, or like metal part, which is light, yet strong, and which can be manufactured at low cost. While we have disclosed two forms with methods for their manufacture it is obvious that the principles disclosed may be embodied in other forms by those skilled in the art and that the details may be widely varied. It is therefore to be understood that our invention is not confined to the specific articles and processes disclosed but includes all structures and processes comprehended within the terms of the appended claims.

What we claim is:

1. The process of making a metal part which consists in passing a solid heated bar between die rolls so cut as to form the bar during its passages into a channel section and a substantially solid section in recurrent pattern with the substantially solid section at least twice the length desired in the finished part, severing the bar so formed at an intermediate point of the solid section, superimposing two severed sections with their channel sections facing each other, and subsequently welding the superimposed sections together.

2. The process set out in claim 1 with the added step of bending the mating sections into a dropped axle form prior to welding.

3. The process of making a metal part which consists in passing a solid heated bar between die rolls so cut as to form the bar during its passage into a central channel section with substantially semicircular end sections, welding together two bars so formed with their juncture lying in a horizontal plane and forming the substantially solid ends to adapt them for connection with the steering knuckles of an automobile.

4. The process set out in claim 3 in which the ends of the metal part are formed for connection with the steering knuckles of an automobile by boring apertures therein.

5. The process set out in claim 3 with the added step of bending the sections into dropped axle form prior to welding.

Signed by us this 25th day of November, 1925.

GEORGE H. HUFFERD.
MATTHEW P. GRAHAM.